Oct. 9, 1934.    A. BRIECHLE ET AL    1,976,213
TURN INDICATOR
Filed June 16, 1933    2 Sheets-Sheet 1
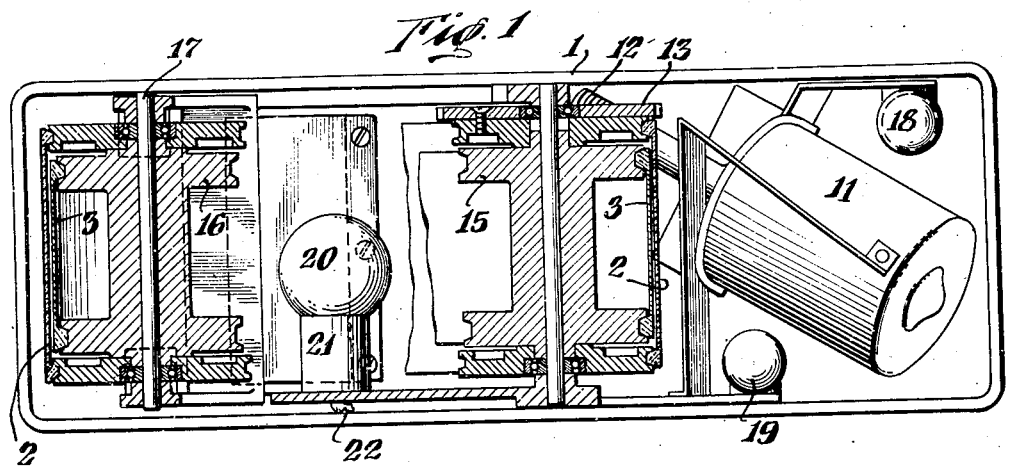
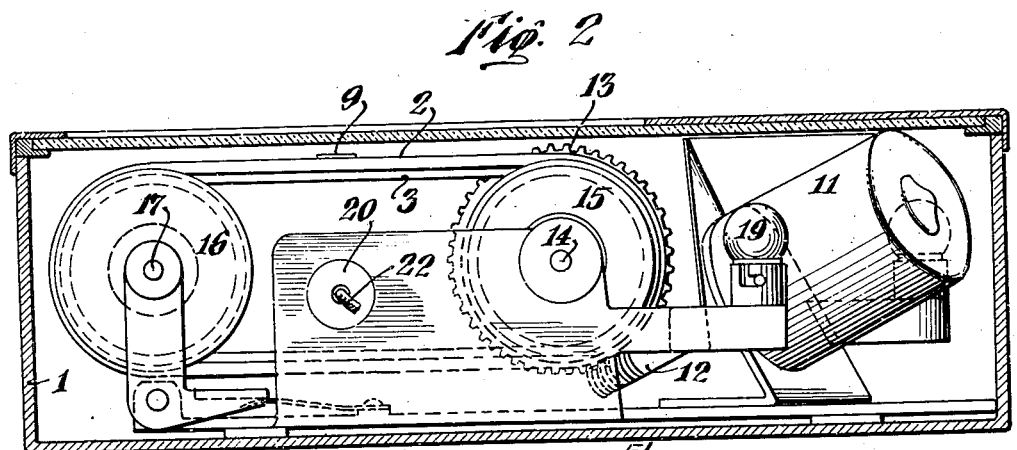
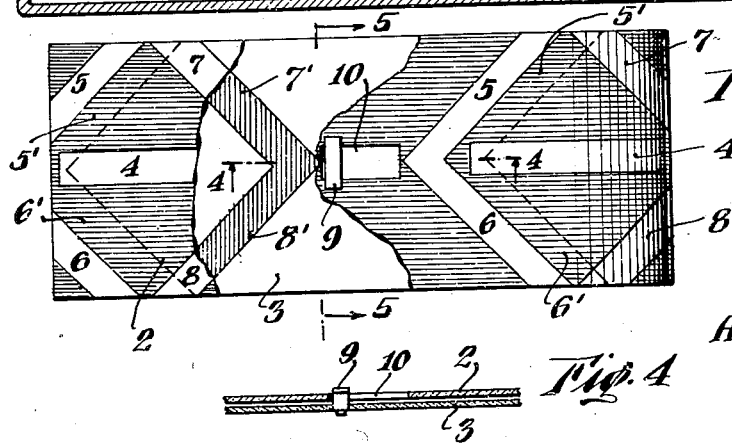
Ambrosius Briechle
Henry Albert
Alois Stauber
INVENTORS
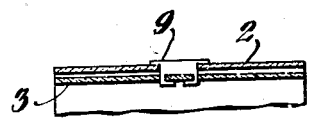
BY
Frank H Harmon
ATTORNEY

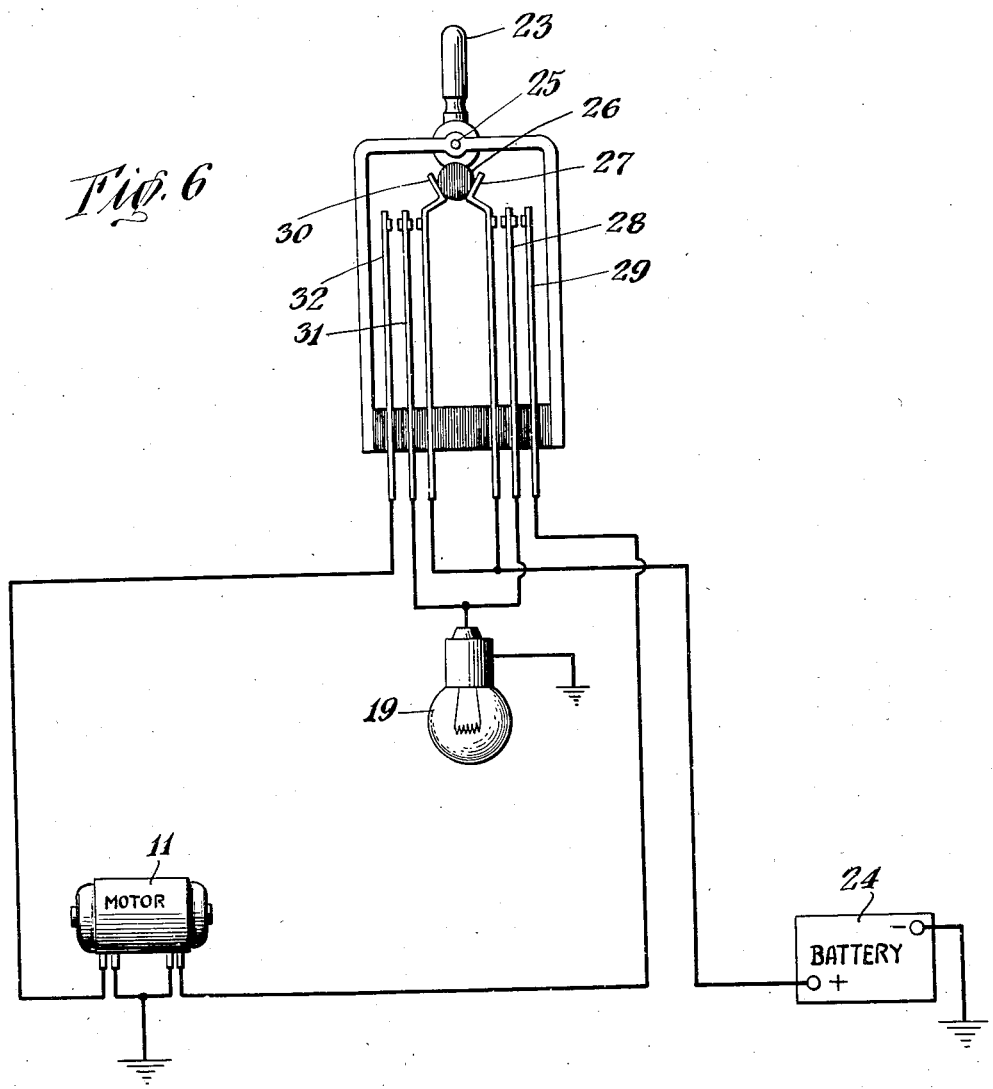

Patented Oct. 9, 1934

1,976,213

UNITED STATES PATENT OFFICE 1,976,213

TURN INDICATOR

Ambrosius Briechle, Henry Albert, and Alois Stauber, Brooklyn, N. Y.

Application June 16, 1933, Serial No. 676,053

7 Claims. (Cl. 177—327)

This invention relates in general to signal apparatus and more particularly to an improved device adapted for use by motor vehicles to indicate the direction in which the operator has an intention to turn while driving.

An object of the invention is to provide such a signal that will more effectively indicate the operator's intention to turn in one direction or the other, so that such indication will be unmistakable and entirely devoid of confusion to operators of vehicles in the rear.

Another object of the invention is to provide such a signal that will not only be in the form of a pointer in the direction of the intended turn but also a signal which will actually physically travel in that direction as well.

Another object of the invention is to provide a simple, convenient and inexpensive device in the form of an easily applied motor vehicle accessory that will have the desired effect of two series of arrows movable in opposite directions, and to so construct the device that in reality the vertical dimensions of the accessory will be no greater than that usually required by a single arrow or single horizontal series thereof and by a simple control arrows may be set in motion and illuminated so as to be visible corresponding to the rotation of the means carrying them, which rotation and direction of rotation may be under such simple manual control for the desired purpose.

It is well known that others in the art have employed electrical devices for turn indicators for motor vehicles and that even in some instances illuminated arrows have been employed, some of the arrows being stationary and merely illuminated, while others have been made up of a series of sections which are progressively illuminated in such a manner as to give an illusory appearance of motion. These devices, however, have been found to be inadequate for the purpose for which they were intended and with the end in view of perfecting a device of this class, it is proposed to employ an electrical system and to provide a pair of drums rotatable in opposite directions, one being a driving drum and the other an idler, the drums to carry an inner and an outer belt with a series of registering apertures or transparent and opaque portions formed therein so as to result in an illuminated arrow pointing in the direction of travel of the belts.

It is further proposed to also employ such an electrical circuit that will selectively set one of the drums in motion in either direction, which in turn will drive the other drum in the same direction, there being introduced a certain lost motion so that as the drums move relative to each other before the drive takes place one set of arrowheads is made transparent and illuminated while the set pointing in the opposite direction is made opaque and non-illuminated and vice versa, the same arrow stem being utilized regardless of which set of arrowheads is illuminated.

This form of device constitutes a compact accessory and gives an unmistakable indication of the operator's intention to turn, in that the arrow will be pointing in the direction of the intended turn, will be illuminated and will actually physically travel in the direction in which it is pointing.

With the foregoing and other objects in view, the invention resides in the combination of parts and in the details of construction hereinafter set forth in the following specification and appended claims, certain embodiments of the invention being illustrated in the accompanying drawings, in which:

Figure 1 is a top plan view of the device with the cover removed;

Figure 2 is a view in side elevation of the device with the side of the casing removed;

Figure 3 is a detail view over the drums which carry the indicating arrows, the drums being partly broken away.

Figure 4 is a view in section taken along line 4—4 of Figure 3;

Figure 5 is a view in section taken along line 5—5 of Figure 3.

Figure 6 is a wiring diagram of the electrical system for controlling the operation of the device.

Referring more particularly to the drawings, the device is particularly adapted for use on the rear or front or both automotive vehicles and employs a casing 1 which is removably secured to the rear of the automobile in any of the well known conventional manners. Inside of the casing the conventional stop light may be employed and may consist of any well known design.

In carrying out the invention the casing may be of no greater height than the usual accessory of this general nature, while the arrow bearing belt is adapted by its rotation to give the desired indication of a turn in either direction. Figure 3 shows an outer belt 2 and an inner belt 3 slidably rotatably mounted therein. The opaque outer belt is provided with a series of horizontal transparent portions 4 which may be centrally located with diagonal transparent portions 5 and 6 which merge to form an arrowhead pointing to the left and diagonal transparent portions 7 and 8 which merge to form an arrowhead pointing to the right.

The effect of this is to provide a double arrow pointing in opposite directions, the arrowheads utilizing a common stem portion 4. Thus if one of the arrowheads is rendered opaque, the light from the interior of the casing illuminates an arrow pointing only in one direction. In order to bring this about the inner belt 3 may be transparent and provided with opaque arrowheads so positioned that under relative movement between the belts some of the opaque arrowheads will come into registry with the transparent ones so as to exclude the illumination from the light source while other opaque and transparent arrowheads which have been in registry will be moved out of registry with each other so as to allow light to pass through the transparent arrowhead. More specifically as the belts rotate in a clockwise direction the arrowheads pointing in that direction are illuminated while the arrowheads pointing in a counterclockwise direction are rendered opaque, and vice versa.

Referring now to Figure 3, the inner belt 3 may have affixed thereto a clip 9 extending outwardly through an elongated slot 10 in the outer belt 2. Assuming for instance the outer belt to be the driving member for the inner belt, the inner belt being loosely carried thereby. As the outer belt rotates counterclockwise the clip abuts the left end of the slot 10 and then carries the inner belt along as a driven member. As this abutment occurs, the transparent arrowheads 5 and 6 in the outer belt are out of alignment with the opaque arrowheads 5' and 6' in the inner belt, so that these arrowheads with the stem portions 4 indicate a counterclockwise rotation and a consequent indication of a left turn of the vehicle. The slot 10 is of such length that the movement of the clip 9 from the right hand extremity to the left hand extremity, as shown in Figure 3, makes for the rotation of the transparent arrowheads 5 and 6 at the registry with the opaque arrowheads 5' and 6'. It therefore follows that in case it is desired to give an indication of a right turn of the motor vehicle if suitable driving power is brought to act on the inner belt the latter will be driven in a clockwise direction but the outer belt will not be moved until the clip 9 engages the right hand side of the slot 10 and the corresponding relative rotation between the two belts is sufficient to bring the transparent arrowheads 7 and 8 out of registry with the opaque arrowheads 7' and 8' and at the same time bring the transparent arrowheads 5 and 6 into registry with the opaque arrowheads 5' and 6' so as to exclude the latter from view while allowing the light to pass through the former to give an indication of a right hand turn.

In order to impart motion to the inner belt there may be provided a suitable reversible electrical motor indicated at 11 and providing the same with a driving worm 12 which meshes with gear 13 mounted on a shaft 14 which carries a reel 15 so as to constitute the driving reel. Figure 6 shows a conventional wiring diagram for reversing the motor so as to impart a rotary motion to the driving drum in either of two selected directions. In this figure there is diagrammatically illustrated a switch including a lever 23 pivotally carried at 25 on a suitable casing and carrying a member 26 which is moved by the operation of the lever. When the top portion of the lever 23 is moved to the left the member 26 engages the contact maker 27 to the right to make contact with members 28 and 29 to complete the circuit for driving the driving drum in one direction. Correspondingly a movement of the lever 23 in the opposite direction will cause the member 26 to engage the member 30 so as to make contact with members 31 and 32 to complete the circuit for driving the driving drum in the other direction. There may also be provided an idler reel 16 loosely mounted on a shaft 17 so that the belts may be placed over the reels so as to be driven in either desired direction. As stated before, the device may include a unitary casing with a compartment to receive the motor and also one or more lamps 18 and 19 over which a plate may be placed to constitute a conventional form of stop light. The remainder of the casing may be provided with any suitable plate of amber or other color, there being suitable provision for a relatively larger lamp 20 fitted in a socket 21 and provided with suitable lead wires 22 which may be switch controlled by any suitable arrangement. The belts are adapted to exclude from view from the exterior any of the light emanating from lamp bulb 20 except through the arrow stems 4 or the selected series of arrowheads. It will be understood that these arrowheads are arranged in series around the inner periphery of the belts and that only one series of arrowheads will be illuminated at one time, that is to say, as the inner belt is actually driving the outer belt in a counterclockwise direction, the arrowheads pointing in that corresponding direction will be illuminated to indicate a left hand turn while when the belts are rotating in a clockwise direction those arrowheads will become non-illuminated and the other series of arrowheads pointing in a clockwise direction will be illuminated so as to give an indication of a right hand turn.

We claim:

1. A vehicle signal device comprising a casing having a transparent opening, a reversible electrical source of power, illuminating means within said casing, a driving drum and an idler drum, connections between said source of power and said driving drum so as to impart rotary motion thereto in opposite directions, a pair of relatively movable concentrically arranged belts carried by said drums, transparent signal arrows carried by one of said belts including arrowheads pointing in opposite directions with a stem common to both, opaque arrowheads carried by the other belt, a connecting drive between said belts having a limited movement in either direction before effecting a drive so as to allow for limited relative movement between the belts in order to effect a registry with the casing opening of the opaque arrowheads with those transparent arrowheads pointing in the direction opposite to that of the rotation of the drums and to effect a non-registry of the opaque arrowheads with those transparent arrowheads passing the casing opening and point in the direction of rotation of said belts to comprise a series of bodily movable arrowheads which are illuminated as viewed from the exterior and which are pointing in the direction of rotation of the belts to constitute a signal for the turning of the vehicle in a corresponding direction.

2. A vehicle signal device comprising a casing with a transparent opening, a reversible electrical source of power, a driving drum and an idler drum, a belt and a member relatively movable therewith arranged about and carried by said drums, means for limiting the extent of said relative movement, driving connections between said source of power and said driving drum so as to impart rotary motion thereto in opposite directions, illuminating means interior of said casing, signal arrows carried by said belt pointing in opposite directions, opaque portions carried by said relatively movable member for allowing the illumination of the arrows pointing in the direction corresponding to that of the rotation of said belt and for preventing the illumination of the arrows pointing in the opposite direction as viewed from the exterior.

3. A vehicle signal device comprising a casing having a transparent opening, a reversible electrical source of power, a driving drum and an idler drum, connections between said source of power and said driving drum so as to impart rotary motion thereto in opposite directions, a belt and a member relatively movable therewith arranged about said drums and carried thereby, transparent signal arrows carried by said belt including arrow heads pointing in opposite directions with a stem common to both, opaque arrow heads carried by said relatively movable member, a connecting drive between said belt and said relatively movable member having a limited movement in either direction before effecting a drive so as to allow for a limited relative movement between said belt and said relatively movable member in order to effect a registry of the opaque arrow heads with those transparent arrow heads pointing in a direction opposite to that of the rotation of the drums and to effect a non-registry of the opaque arrow heads with those transparent arrow heads pointing in the direction of rotation of said belt to comprise a series of bodily movable arrow heads which are illuminated as viewed from the exterior and which are pointing in the direction of rotation of the belts to constitute a signal for the turning of the vehicle in a corresponding direction.

4. A vehicle signal device comprising a casing with a transparent face, a reversible source of energy and a belt driven thereby, a second belt and a sliding connection between the same and said first belt for effecting a driving connection between the belts in either direction but allowing a limited relative movement therebetween, illuminating means within said casing, said members being rotatable upon a substantially vertical common axis, said members carrying a series of spaced indicating arrowheads pointing in opposite directions with intervening common stems, control means for said source of energy for selectively driving said members in either direction together at will and for rendering the illumination means visible through the casing and through the spaced bodily laterally moving arrows travelling in the direction of rotation of the belts and concealing from view the illumination means through the arrows travelling in that direction but pointing in the opposite direction.

5. A vehicle signal device comprising a casing with a transparent opening, a driving drum and an idler drum, belts carried by said drums, an electrical motor and switch means for reversing the same, driving connection between said motor and said driving drum for driving said belts in opposite directions, signal arrows carried by said belts pointing in opposite directions, said belts having opaque and transparent portions, illuminating means interior of said casing, and means for selectively disposing opaque and transparent portions as to allow the rays of said illuminating means to illuminate the arrows in registry with said casing opening and pointing in the direction of travel of said belts and to prevent such illumination of the arrows pointing in the opposite direction, as viewed from the exterior.

6. A vehicle signal device comprising a casing having a transparent opening, a reversible electrical source of power, a driving drum and an idler drum, belts carried by said drums, driving connections between said source of power and said driving drum so as to impart rotary motion thereto in opposite directions, illuminating means within said casing, said belts having opaque and transparent portions, signal arrows carried by one of said belts pointing in opposite directions and means carried by the other belt for disposing said opaque and transparent portions so as to bring about a registry of the illumination means, the casing opening and a consequent illumination of the arrows pointing in the direction corresponding to that of the rotation of said belts and to prevent the illumination of the arrows pointing in the opposite direction, as viewed from the exterior.

7. A vehicle signal device comprising a casing with a transparent opening, a driving drum and an idler drum, a belt and a member relatively movable therewith, arranged about and carried by said drums, said belt and member having transparent and opaque portions, positive means for limiting said relative movement, an electrical motor and switch means for reversing the same, a driving connection between said motor and said driving drum for driving said belt and said relatively movable member in opposite directions, signal arrows carried by said belts pointing in opposite directions, illuminating means interior of said casing, and means for disposing said opaque portions as to allow the rays of light from said illuminating means to illuminate the arrows pointing in the direction of travel of said belt, and to prevent the illumination of the other arrows, as viewed from the exterior.

AMBROSIUS BRIECHLE.
HENRY ALBERT.
ALOIS STAUBER.